(12) United States Patent
Watts

(10) Patent No.: US 9,789,610 B1
(45) Date of Patent: Oct. 17, 2017

(54) SAFE PATH PLANNING FOR COLLABORATIVE ROBOTS

(71) Applicant: X Development LLC, Mountain View, CA (US)

(72) Inventor: Kevin William Watts, Palo Alto, CA (US)

(73) Assignee: X Development LLC, Mountain View, CA (US)

( * ) Notice: Subject to any disclaimer, the term of this patent is extended or adjusted under 35 U.S.C. 154(b) by 187 days.

(21) Appl. No.: 14/843,288

(22) Filed: Sep. 2, 2015

(51) Int. Cl.
*B25J 9/16* (2006.01)

(52) U.S. Cl.
CPC ........... *B25J 9/1676* (2013.01); *B25J 9/1697* (2013.01); *Y10S 901/02* (2013.01); *Y10S 901/09* (2013.01)

(58) Field of Classification Search
CPC ... B25J 9/1676; B25J 9/1697; Y10S 9001/02; Y10S 901/09
USPC .................................................. 700/245, 253
See application file for complete search history.

(56) References Cited

U.S. PATENT DOCUMENTS

| 7,269,479 | B2 * | 9/2007 | Okamoto | B25J 5/007 318/568.12 |
|---|---|---|---|---|
| 7,332,890 | B2 * | 2/2008 | Cohen | A47L 9/2857 320/109 |
| 7,650,205 | B2 * | 1/2010 | Calcagno | G05B 19/42 318/568.1 |
| 7,664,570 | B2 * | 2/2010 | Suita | B25J 9/1666 318/563 |
| 7,783,387 | B2 * | 8/2010 | Calcagno | G05B 19/42 318/567 |
| 7,888,825 | B2 * | 2/2011 | Iida | B25J 19/06 307/326 |
| 8,249,747 | B2 | 8/2012 | Kock | |
| 8,267,137 | B2 * | 9/2012 | Weber | B29C 65/203 156/359 |
| 8,326,590 | B2 * | 12/2012 | Kock | G05B 19/4061 703/8 |
| 8,515,563 | B2 * | 8/2013 | Weddingfeld | G05B 19/052 700/2 |

(Continued)

OTHER PUBLICATIONS

Hu et al., Trajectory Planning of Space Robot System for Reorientation after Capturing Target, 2008, IEEE, p. 1-6.*

(Continued)

*Primary Examiner* — McDieunel Marc
(74) *Attorney, Agent, or Firm* — McDonnell Boehnen Hulbert & Berghoff LLP

(57) ABSTRACT

Disclosed herein are methods and systems for determining a safe path for movement of an object by a robotic system. According to these implementations, the robotic system may determine a safety level for each of a plurality of relative orientations of an object. Each such relative orientation may define a spatial orientation of the object relative to direction of movement of the object. Based on the determined safety levels, the robotic system may then determine, for each of the plurality of relative orientations, a velocity limit for movement of the object with a particular relative orientation. Based at least in part on the determined velocity limits, the robotic system may then determine a path for moving the object from a first location to a second location. As such, the robotic system may move the object from the first location to the second location based on the determined path.

20 Claims, 8 Drawing Sheets

(56) References Cited

U.S. PATENT DOCUMENTS

| | | | |
|---|---|---|---|
| 8,527,091 B2 | 9/2013 | Bosscher et al. | |
| 8,624,704 B2 * | 1/2014 | Bornstein | G05B 19/0426 |
| | | | 340/3.1 |
| 8,918,213 B2 | 12/2014 | Rosenstein et al. | |
| 8,965,561 B2 | 2/2015 | Jacobus et al. | |
| 9,043,025 B2 | 5/2015 | Brooks et al. | |
| 9,149,927 B2 * | 10/2015 | Sturm | B25J 5/007 |
| 9,415,516 B2 * | 8/2016 | Fudaba | B25J 9/1689 |
| 9,516,996 B2 * | 12/2016 | Diolaiti | A61B 1/00009 |

OTHER PUBLICATIONS

Jeong et al., Optimal Braking for Impact Force Reduction Using the Dynamics of Redundant Manipulators, 2006, IEEE, p. 1898-1903.*
Chong et al., Dextrous Manipulation Planning of Multifingered Hands with Soft Finger Contact Model, 1994, IEEE, p. 3389-3396.*

* cited by examiner

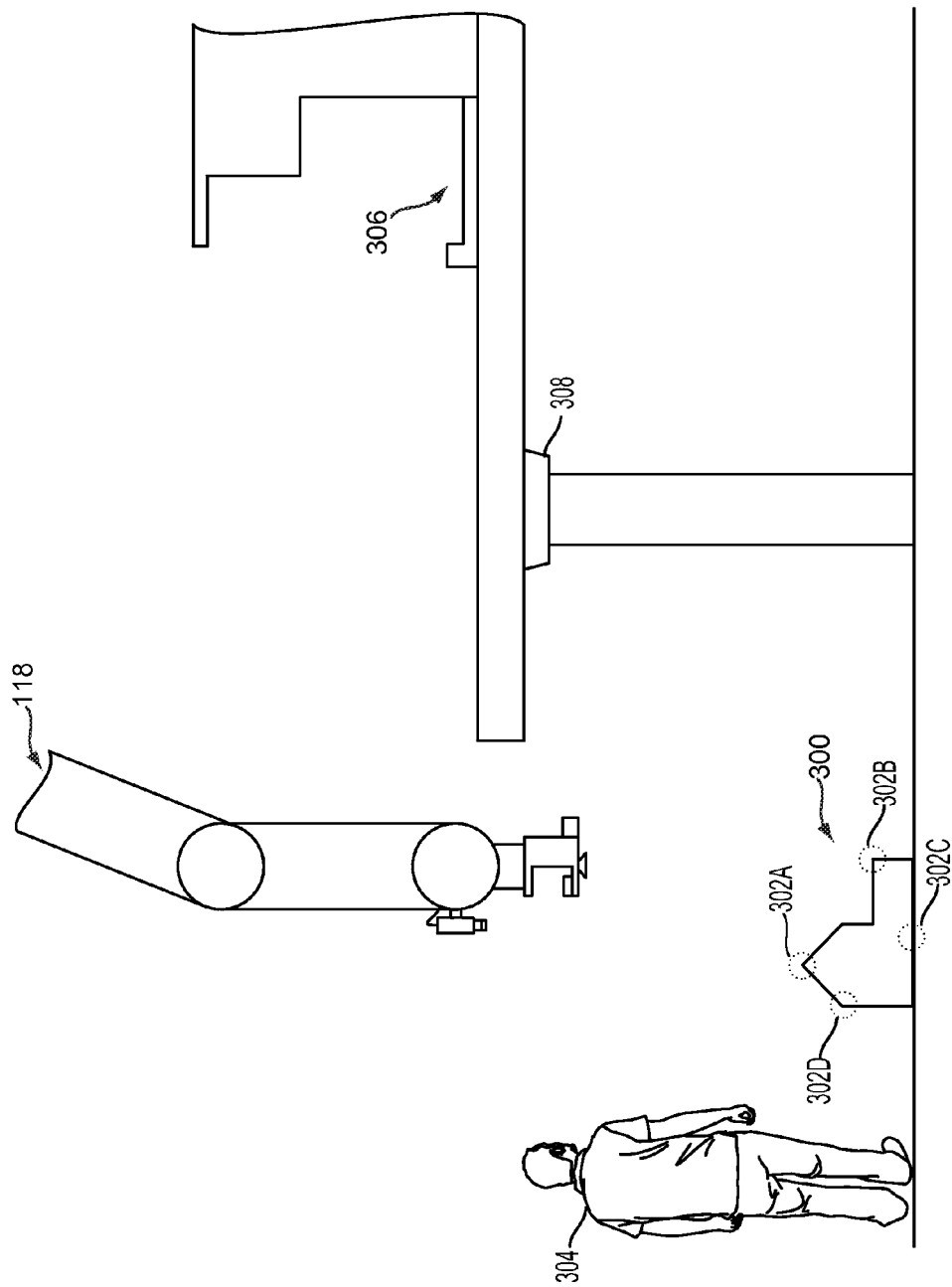

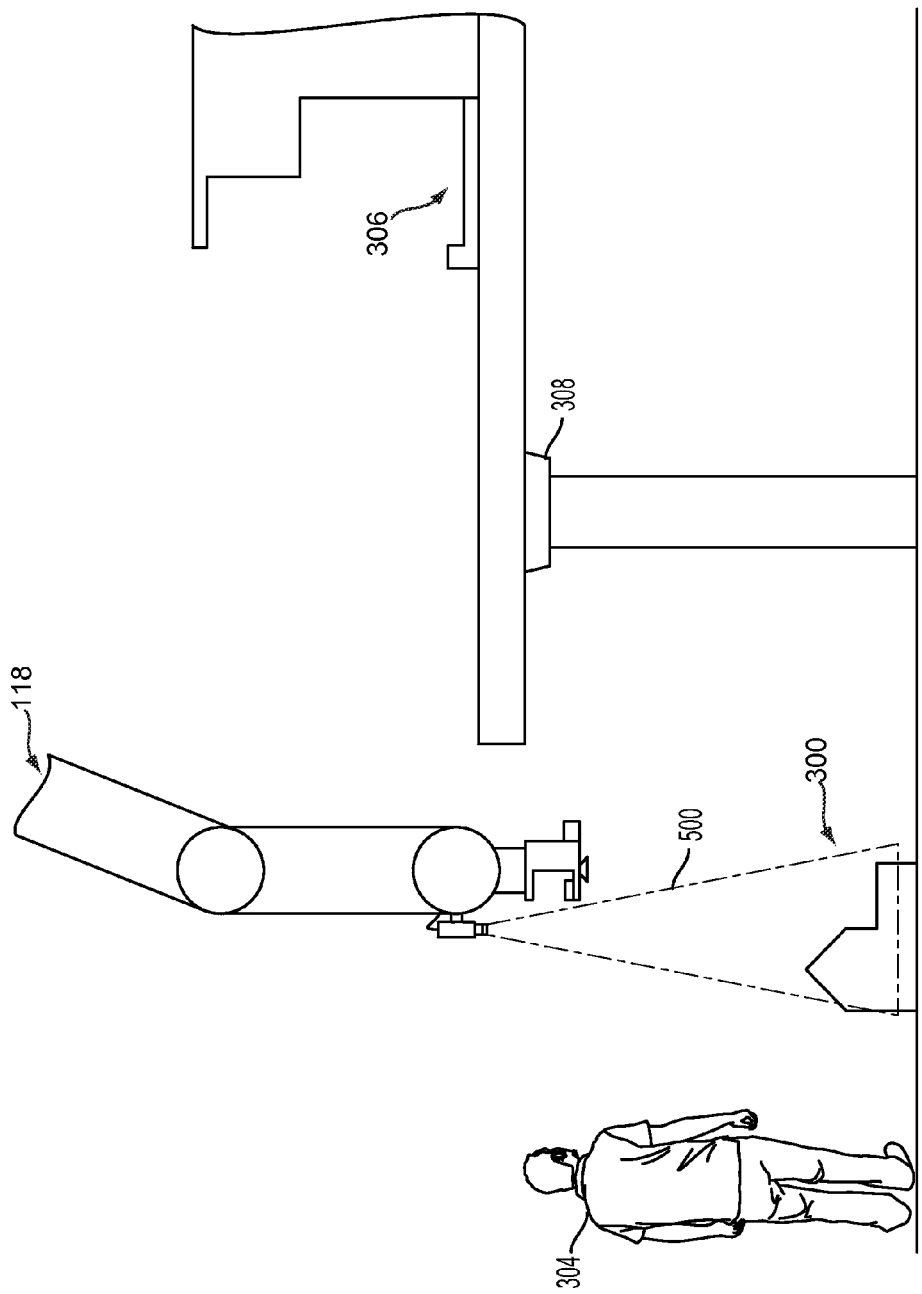

US 9,789,610 B1

SAFE PATH PLANNING FOR COLLABORATIVE ROBOTS

BACKGROUND

Robotic systems may be used for applications involving material handling, welding, assembly, and dispensing, among others. Over time, the manner in which these robotic systems operate is becoming more intelligent, more efficient, and more intuitive. As robotic systems become increasingly prevalent in numerous aspects of modern life, the need for robotic systems capable of safely working in various environments becomes apparent. Therefore, a demand for such robotic systems has helped open up a field of innovation in safety techniques, sensing techniques, as well as component design and assembly.

SUMMARY

According to an example implementation, a robotic system may carry out a path planning process for safe movement of an object. As part of this path planning process, the robotic system may determine a safety level for each relative orientation from among a plurality of relative orientations of the object. Each such relative orientation may define a spatial orientation of the object relative to direction of movement of the object. Once the robotic system determines the safety levels, the robotic system may use the determined safety levels as a basis for determining, for each of the plurality of relative orientations, a velocity limit for movement of the object in a particular relative orientation. Once the robotic system determines the velocity limits, the robotic system may then use these determined velocity limits as constraints (e.g., in addition to other constraints) in the path planning process and may then move the object in accordance with the planned path.

In one aspect, a method is provided. The method involves a robotic system determining a safety level for each of a plurality of relative orientations of an object, where each relative orientation of the plurality of relative orientations defines a spatial orientation of the object relative to direction of movement of the object. The method also involves, based on the determined safety levels, the robotic system determining, for each of the plurality of relative orientations, a velocity limit for movement of the object with a particular relative orientation. The method additionally involves, based at least in part on the determined velocity limits, the robotic system determining a path for moving the object from a first location to a second location. The method further involves the robotic system moving the object from the first location to the second location based on the determined path.

In another aspect, a non-transitory computer readable medium is provided. The non-transitory computer readable medium has stored therein instructions executable by one or more processors to cause a robotic system to perform functions. The functions include determining a safety level for each of a plurality of relative orientations of an object, where each relative orientation of the plurality of relative orientations defines a spatial orientation of the object relative to direction of movement of the object. The functions also include, based on the determined safety levels, determining, for each of the plurality of relative orientations, a velocity limit for movement of the object with a particular relative orientation. The functions additionally include, based at least in part on the determined velocity limits, determining a path for moving the object from a first location to a second location. The functions further include moving the object from the first location to the second location based on the determined path.

In yet another aspect, a robotic system is provided. The robotic system includes one or more processors and a non-transitory computer readable medium. The robotic system also includes program instructions stored on the non-transitory computer readable medium and executable by the one or more processors to determine a safety level for each of a plurality of relative orientations of an object, where each relative orientation of the plurality of relative orientations defines a spatial orientation of the object relative to direction of movement of the object. The program instructions are also executable to, based on the determined safety levels, determine, for each of the plurality of relative orientations, a velocity limit for movement of the object with a particular relative orientation. The program instructions are additionally executable to, based at least in part on the determined velocity limits, determine a path for moving the object from a first location to a second location. The program instructions are further executable to move the object from the first location to the second location based on the determined path.

In yet another aspect, a system is provided. The system may include means for determining a safety level for each of a plurality of relative orientations of an object, where each relative orientation of the plurality of relative orientations defines a spatial orientation of the object relative to direction of movement of the object. The system may also include means for, based on the determined safety levels, determining, for each of the plurality of relative orientations, a velocity limit for movement of the object with a particular relative orientation. The system may additionally include means for, based at least in part on the determined velocity limits, determining a path for moving the object from a first location to a second location. The system may further include means for moving the object from the first location to the second location based on the determined path.

These as well as other aspects, advantages, and alternatives will become apparent to those of ordinary skill in the art by reading the following detailed description, with reference where appropriate to the accompanying drawings.

BRIEF DESCRIPTION OF THE DRAWINGS

FIG. 3 illustrates the example robotic arm preparing to move an object to a drop-off location, according to an example implementation.

FIG. 5 illustrates the example robotic arm receiving image data representative of the object, according to an example implementation.

DETAILED DESCRIPTION

Figure 1A:
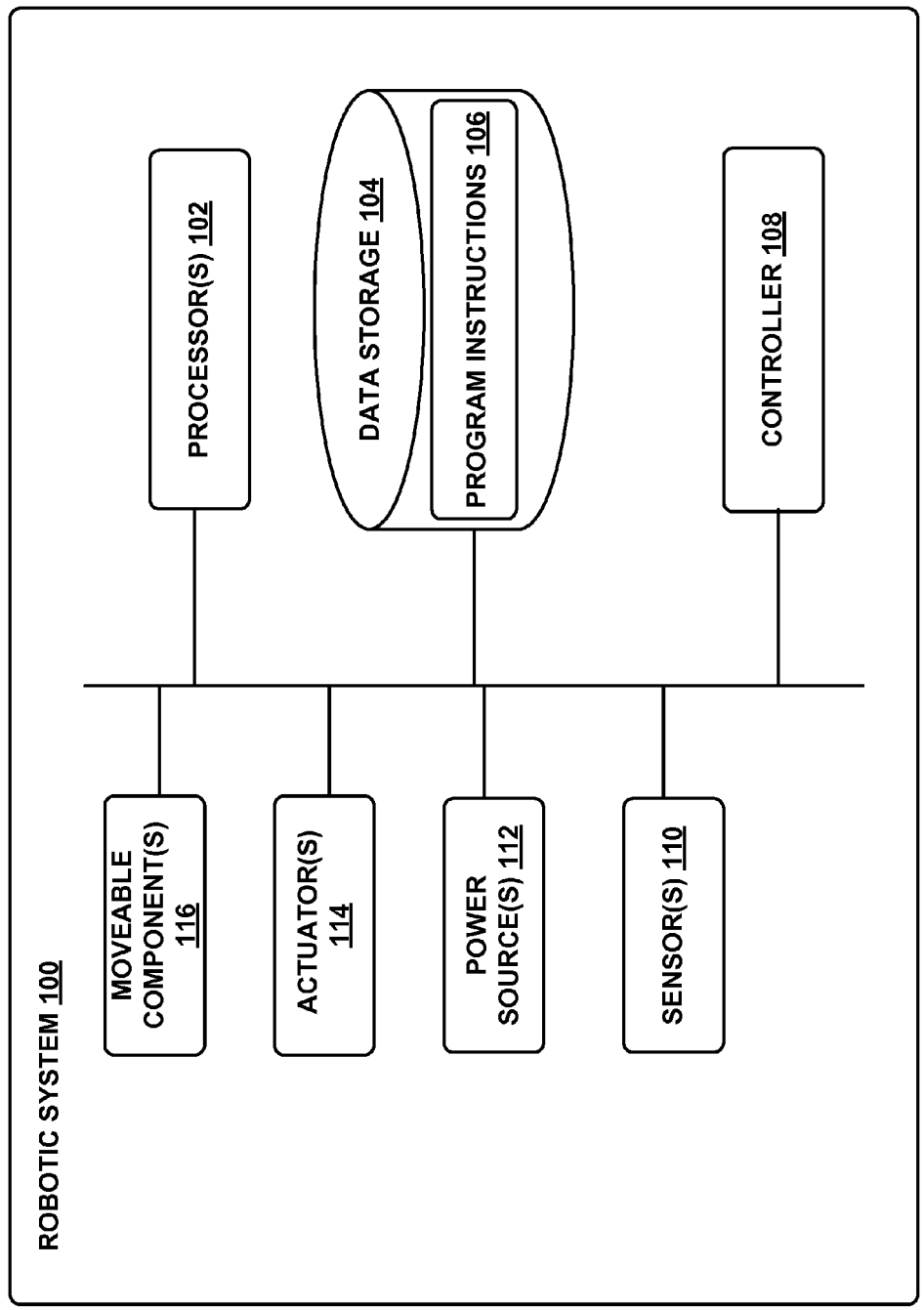
FIG. 1A illustrates components of an example robotic system, according to an example implementation.

Example methods and systems are described herein. It should be understood that the words "example," "exemplary," and "illustrative" are used herein to mean "serving as an example, instance, or illustration." Any implementation or feature described herein as being an "example," being "exemplary," or being "illustrative" is not necessarily to be construed as preferred or advantageous over other implementations or features. The example implementations described herein are not meant to be limiting. It will be readily understood that the aspects of the present disclosure, as generally described herein, and illustrated in the figures, can be arranged, substituted, combined, separated, and designed in a wide variety of different configurations, all of which are explicitly contemplated herein.

I. Overview

As robotic systems become more prevalent in various industries and in various other aspects of modern life, safety considerations may play an increased role in design and development of robotic systems that operate in the vicinity of humans and/or in the vicinity of various objects. In some cases, robotic systems may be placed in cages to increase safety. However, these cages may increase costs and may limit the extent of collaboration between humans and the robotic systems. In other cases, robotic systems may not be placed in cages; but in such cases, the extent of collaboration between humans and the robotic systems may still be relatively limited due to safety concerns resulting from the robotic systems carrying out various operations in the vicinity of humans.

According to various implementations, described herein are methods and systems for determining a safe path that a robotic system can use to move an object, which may ultimately result in increased safety and thus an increase in the extent of collaboration between humans and robotic systems. According to these implementations, a robotic system may determine safety levels for each of various relative orientations of the object so as to ultimately determine safe velocity limits for movement of the object with each relative orientation. Each such relative orientation may be a particular spatial orientation of the object relative to the direction in which the object will be moved (or is being moved) by the robotic system. The robotic system may determine these safety levels because each relative orientation may result in different portions of the object facing towards different respective directions relative to the path and/or relative to obstacles in the environment, with some of these portions potentially being considered as relatively unsafe (e.g., a portion having an acute angle) to obstacles in the environment (e.g., unsafe to humans and/or to other objects).

Once the robotic system determines the safety levels for the various relative orientations, the robotic system may use the safety levels as a basis for determining velocity limits corresponding to the various relative orientations. More specifically, each respective velocity limit may define a maximum velocity with which the robotic system is allowed to move the object when moving the object with a respective relative orientation. By way of example, the robotic system may determine higher velocity limits for relative orientations having higher corresponding safety levels while determining lower velocity limits for relative orientations having lower corresponding safety levels. In this manner, the robotic system may consider safety of the various relative orientations of the object when setting limits for the velocities with which to move the object towards a target location.

Generally, when a robotic system determines a path for moving an object, the robotic system may engage in a path planning process that considers various constraints. These constraints may include locations of obstacles in the environment, energy consumption limits, and/or joint limits of the robotic system, among others. Given this path planning process, the robotic system could use the determined velocity limits (and/or the determined safety levels) as additional or alternative constraints in the path planning process. With this arrangement, the robotic system could then use such constraints to determine various safe relative orientations to use along the path as well as specific velocities to use along the path. In doing so, the robotic system may select the specific velocities so as to maintain each specific velocity below the corresponding velocity limit at a particular segment of the path (e.g., depending on the selected relative orientation of the object at that particular segment) while also selecting the specific velocities such that the object can still be moved in the shortest time period possible given the various safety considerations.

II. Illustrative Systems

Referring now to the figures, FIG. 1A shows an example configuration of a robotic system 100. Robotic system 100 may be any device that has a computing ability and interacts with its surroundings with an actuation capability and/or with ability to emit/generate physical phenomena such as light and/or sound, among others. For instance, the robotic system 100 may be a humanoid robot, a robotic arm, or a quadruped robot, among others. Additionally, the robotic system 100 may also be referred to as a robotic device, a robotic manipulator, or a robot, among others.

The robotic system 100 is shown to include processor(s) 102, data storage 104, program instructions 106, controller 108, sensor(s) 110, power source(s) 112, actuator(s) 114, and movable component(s) 116. Note that the robotic system 100 is shown for illustration purposes only and robotic system 100 may include additional components and/or have one or more components removed without departing from the scope of the disclosure. Further, note that the various components of robotic system 100 may be arranged and connected in any manner.

Processor(s) 102 may be a general-purpose processor or a special purpose processor (e.g., digital signal processors, application specific integrated circuits, etc.). The processor(s) 102 can be configured to execute computer-readable program instructions 106 that are stored in the data storage 104 and are executable to provide the functionality of the robotic system 100 described herein. For instance, the program instructions 106 may be executable to provide functionality of controller 108, where the controller 108 may be configured to instruct an actuator 114 to cause movement of one or more movable component(s) 116.

The data storage 104 may include or take the form of one or more computer-readable storage media that can be read or accessed by processor(s) 102. The one or more computer-readable storage media can include volatile and/or non-volatile storage components, such as optical, magnetic, organic or other memory or disc storage, which can be integrated in whole or in part with processor(s) 102. In some implementations, the data storage 104 can be implemented using a single physical device (e.g., one optical, magnetic, organic or other memory or disc storage unit), while in other implementations, the data storage 104 can be implemented using two or more physical devices. Further, in addition to the computer-readable program instructions 106, the data storage 104 may include additional data such as diagnostic data, among other possibilities.

The robotic system 100 may include one or more sensor(s) 110 such as force sensors, proximity sensors, load sensors, position sensors, touch sensors, depth sensors, ultrasonic range sensors, infrared sensors, Global Positioning System (GPS) receivers, sonar, optical sensors, biosensors, Radio Frequency identification (RFID) sensors, Near Field Communication (NFC) sensors, wireless sensors, compasses, smoke sensors, light sensors, radio sensors, microphones, speakers, radar, cameras (e.g., color cameras, grayscale cameras, and/or infrared cameras), depth sensors (e.g., Red Green Blue plus Depth (RGB-D), lasers, a light detection and ranging (LIDAR) device, a structured-light scanner, and/or a time-of-flight camera), a stereo camera, motion sensors (e.g., gyroscope, accelerometer, inertial measurement unit (IMU), and/or foot step or wheel odometry), and/or range sensors (e.g., ultrasonic and/or infrared), among others. The sensor(s) 110 may provide sensor data to the processor(s) 102 to allow for appropriate interaction of the robotic system 100 with the environment. Additionally, the robotic system 100 may also include one or more power source(s) 112 configured to supply power to various components of the robotic system 100. Any type of power source may be used such as, for example, a gasoline engine or a battery.

The robotic system 100 may also include one or more actuator(s) 114. An actuator is a mechanism that may be used to introduce mechanical motion. In particular, an actuator may be configured to convert stored energy into movement of one or more components. Various mechanisms may be used to power an actuator. For instance, actuators may be powered by chemicals, compressed air, or electricity, among other possibilities. With this arrangement, actuator(s) 114 may cause movement of various movable component(s) 116 of the robotic system 100. The moveable component(s) 116 may include appendages such as robotic arms, legs, and/or hands, among others. The moveable component(s) 116 may also include a movable base, wheels, and/or end effectors, among others. Further, when a robotic system 100 includes at least one end effector, such an end effector may be a tool and/or a gripper, among others.

Figure 1B:
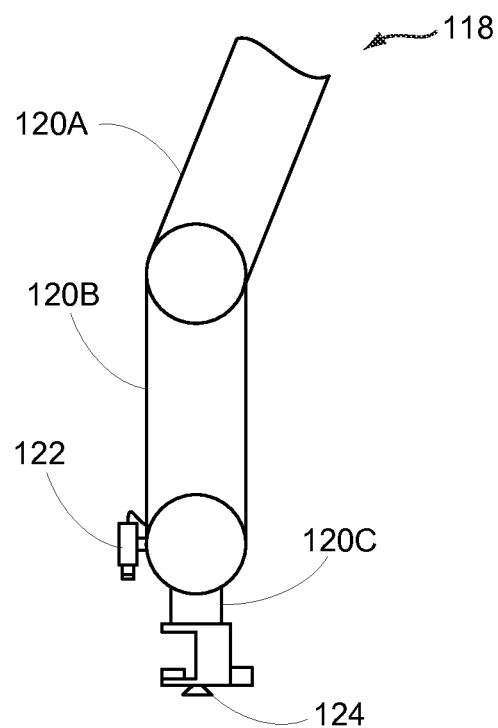
FIG. 1B illustrates an example robotic arm, according to an example implementation.

A robotic system 100 may take on various forms. To illustrate, refer to FIG. 1B showing an example robotic arm 118. As shown, the robotic arm 118 includes movable component(s) 116, such as appendages 120A to 120C, which allow the robotic arm 118 to move around and interact with the environment. Additionally, the robotic arm 118 is shown to include a sensor 122 (e.g., an image capture device), such as one or more of the sensors discussed above. For example, the sensor 122 may be a LIDAR device, a time-of-flight camera, a structured light scanner, and/or a stereo camera, among other possibilities. Further, the robotic arm 118 includes a gripping component 124 ("gripper 124") for gripping objects in an environment of the robotic arm 118. For example, gripper 124 may be a suction type gripper; however, any type of gripper may be used.

III. Illustrative Methods

Figure 2:
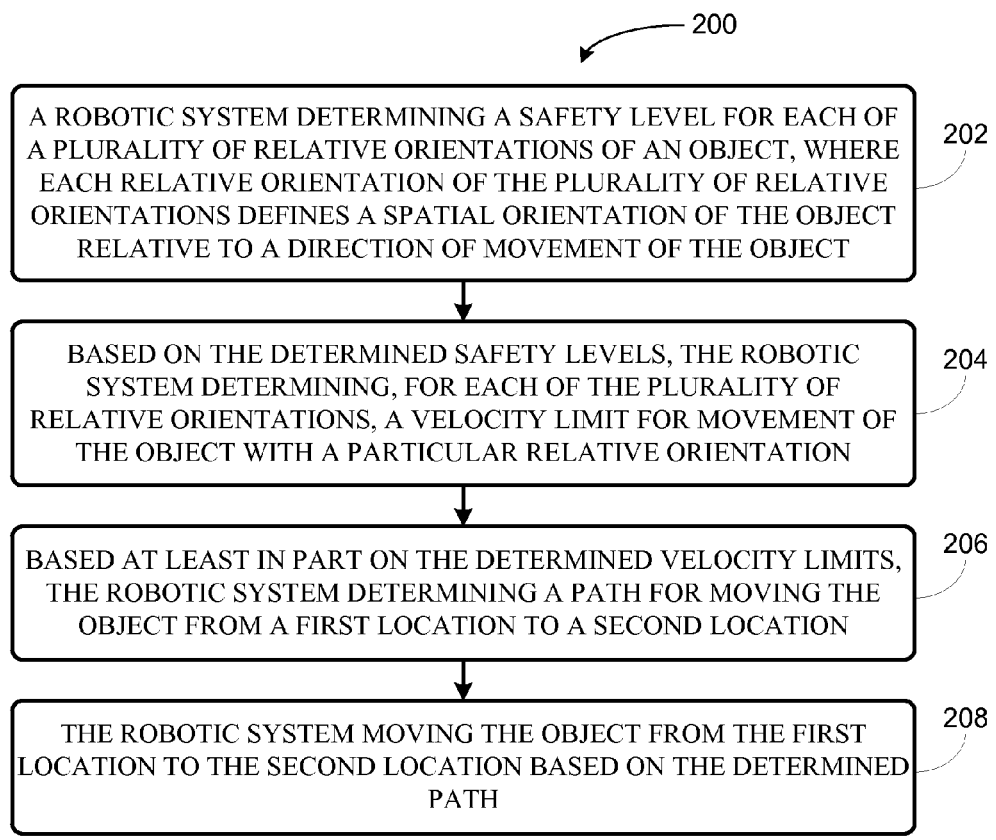
FIG. 2 is an example flowchart for determining a safe path, according to an example implementation.
Figure 4A:
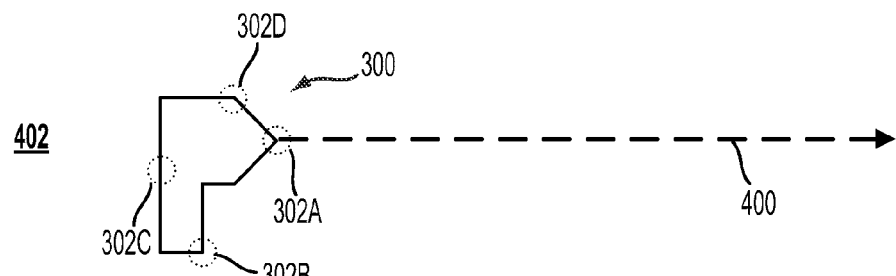
FIGS. 4A to 4D illustrate various example relative orientations of the object, according to an example implementation.
Figure 4B:
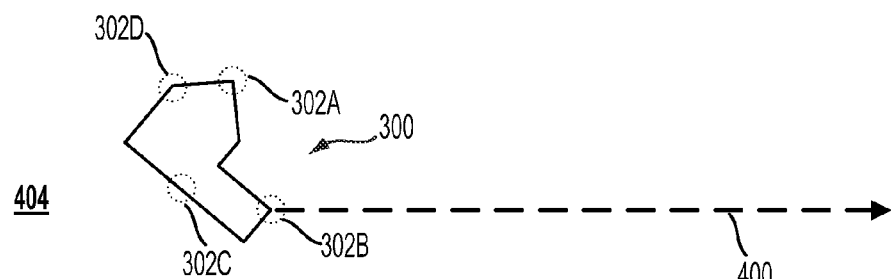
Figure 4C:
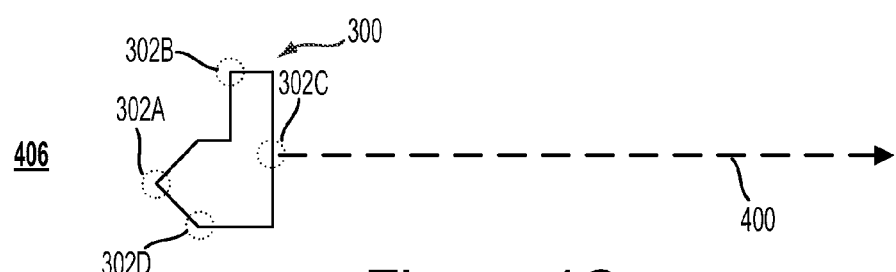
Figure 4D:
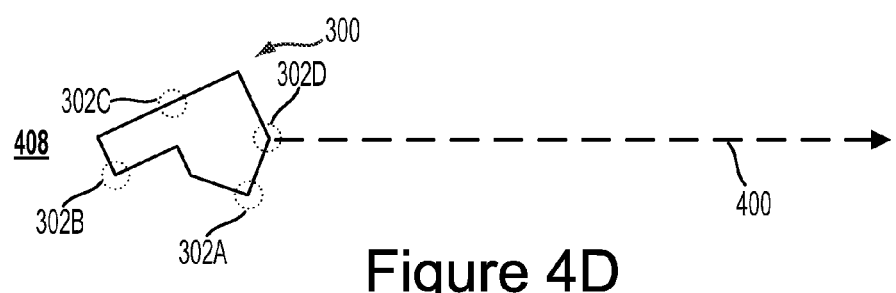

FIG. 2 is a flowchart illustrating a method 200, according to an example implementation. In particular, method 200 may be implemented to determine a safe path for movement of an object by a robotic system.

Method 200 shown in FIG. 2 (and other processes and methods disclosed herein) presents a method that can be implemented within an arrangement involving, for example, the robotic system 100 (or more particularly by one or more components or subsystems thereof, such as by a processor and a non-transitory computer-readable medium having instructions that are executable to cause the device to perform functions described herein). Additionally or alternatively, method 200 may be implemented within any other arrangements and systems.

Method 200 and other processes and methods disclosed herein may include one or more operations, functions, or actions as illustrated by one or more of blocks 202-208. Although the blocks are illustrated in sequential order, these blocks may also be performed in parallel, and/or in a different order than those described herein. Also, the various blocks may be combined into fewer blocks, divided into additional blocks, and/or removed based upon the desired implementation.

In addition, for the method 200 and other processes and methods disclosed herein, the flowchart shows functionality and operation of one possible implementation of present implementations. In this regard, each block may represent a module, a segment, or a portion of program code, which includes one or more instructions executable by a processor for implementing specific logical functions or steps in the process. The program code may be stored on any type of computer readable medium, for example, such as a storage device including a disk or hard drive. The computer readable medium may include non-transitory computer readable medium, for example, such as computer-readable media that stores data for short periods of time like register memory, processor cache and Random Access Memory (RAM). The computer readable medium may also include non-transitory media, such as secondary or persistent long term storage, like read only memory (ROM), optical or magnetic disks, compact-disc read only memory (CD-ROM), for example. The computer readable media may also be any other volatile or non-volatile storage systems. The computer readable medium may be considered a computer readable storage medium, for example, or a tangible storage device. In addition, for the method 200 and other processes and methods disclosed herein, each block in FIG. 2 may represent circuitry that is wired to perform the specific logical functions in the process.

At block 202, method 200 involves a robotic system determining a safety level for each of a plurality of relative orientations of an object, where each relative orientation of the plurality of relative orientations defines a spatial orientation of the object relative to direction of movement of the object.

In practice, a robotic system may seek to move an object from a first location to a second location. To do so, the robotic system may engage in a path planning process to determine a path for moving the object from the first location to the second location. This path planning process may occur before the robotic system begins to move the object and/or may occur while the robotic system is moving the object. As part of this path planning process, the robotic system may consider various factors, such as obstacles (e.g., other objects and/or humans) in the environment and/or shape of the object for instance. For example, FIG. 3 illustrates the robotic arm 118 seeking to move object 300 to a drop-off location 306. As shown, the robotic arm 118 is in the vicinity of a human 304 and a platform 308. Hence, the robotic arm 118 may consider nearby presence of the human 304 and the platform 308 as part of the path planning process.

Further, FIG. 3 shows that the object 300 has an irregular shape and includes portions 302A to 302D, as well as other portions. As shown, portion 302A is a portion having an acute angle, portion 302B is a portion having a right angle (e.g., a corner), portion 302C is a flat portion (e.g., having a one hundred and eighty degree (180°) angle), and portion 302D is a portion having an obtuse angle. While the object 300 is shown to have a specific irregular shape, the example implementations disclosed herein may extend to objects having various shapes and sizes. Moreover, while FIG. 3 shows a two-dimensional (2D) representation of the object, the example implementations disclosed herein may also apply in the context of three-dimensional (3D) objects. Yet further, the object at issue may be a part of the robotic system, such as an end effector of the robotic system for instance. In this instance, the safety techniques described herein may involve safety evaluation of both an end effector (and/or other parts of the robotic system) and perhaps an object being grasped by the end effector, among other possibilities. Other illustrations are also possible.

Disclosed herein are various implementations describing additional factors that the robotic system may consider as part of the path planning process. These additional factors may include safety of various relative orientations of the object. As noted, a relative orientation may define a spatial orientation of the object relative to direction of movement of the object. For instance, one example relative orientation may include a portion of the object (e.g., one of the portions 302A to 302D) being oriented toward the direction of movement of the object while another example relative orientation may include another portion of the object (e.g., another portion from among the portions 302A to 302D) being oriented toward the direction of movement of the object.

FIGS. 4A to 4D illustrate several example relative orientations 402 to 408, with each such relative orientation defining a spatial orientation of the object 300 relative to direction of movement 400 of the object 300. In one example, relative orientation 402 shows portion 302A of object 300 as being orientated toward the direction of movement 400 of the object 300. In another example, relative orientation 404 shows portion 302B of object 300 as being orientated toward the direction of movement 400 of the object 300. In yet another example, relative orientation 406 shows portion 302C of object 300 as being orientated toward the direction of movement 400 of the object 300. In yet another example, relative orientation 408 shows portion 302D of object 300 as being orientated toward the direction of movement 400 of the object 300. Other examples are also possible.

As noted, the robotic system may consider safety of various relative orientations of the object. To do so, the robotic system may specifically evaluate safety of various portions of the object. The robotic system may do so because different portions of an object may have different impacts on a given obstacle in an event of a collision between the object and the obstacle. For instance, a flat portion of the object may be considered as safer to a human when compared to safety of a corner of the object. Moreover, a collision between a specific portion of the object and an obstacle may have a relatively significant impact on the obstacle when the specific portion is oriented toward the direction of movement of the object. Hence, the robotic system may evaluate safety of a specific relative orientation having the specific portion oriented toward the direction of movement of the object, and may also evaluate safety of various other relative orientations.

Referring again to FIGS. 4A to 4D, the robotic arm 118 may evaluate safety of each of the relative orientations 402 to 408. To do so, the robotic arm 118 may evaluate safety of each of the portions 302A to 302D of the object 300. For instance, the robotic arm 118 may do so by determining a safety level for each of the portions, or may do so in other ways. A safety level could take on various forms. By way of example, a safety level may take the form of a numerical value. For instance, an example safety level may be an eight ("8") on a scale of one ("1") to ten ("10"), with one being the lowest safety level (e.g., least safe) and with ten being the highest safety level (e.g., safest). Other examples are also possible.

According to an example implementation, the robotic arm 118 may use the evaluated safety of each of the portions of the object 300 to determine safety of the various relative orientations. In one example, a safety level of a given portion may be the safety level of a given relative orientation having this given portion being oriented toward the direction of movement. For instance, relative orientation 402 shows portion 302A of object 300 as being orientation in the direction of movement 400 of the object 300. In this instance, the safety level of the relative orientation 402 may be the safety level of the portion 302A.

In another example, rather than only considering safety of the given portion that is oriented toward the direction of movement 400, the robotic arm 118 may consider safety of two or more portions of the object 300 when determining safety of a given relative orientation. For instance, the safety level of a given relative orientation may be a weighted average of the safety levels of the two or more portions, with each weight depending on various factors. These various factors may include the orientation of a given portion relative to the direction of movement 400. As a specific example, the robotic arm 118 may determine first safety level of a first portion of the object 300 that is facing towards a direction that is the same as the direction of movement 400 of the object 300 (e.g., portion 302A in relative orientation 402). This first safety level may be given a first weight. Whereas, the robotic arm 118 may also determine a second safety level of a second portion of the object 300 that is facing towards a direction that is opposite to the direction of movement 400 of the object 300 (e.g., portion 302C in relative orientation 402). In this case, the second safety level may be given a second weight that is lower than the first weight. This may occur because the second portion is facing toward a direction opposite to the direction of movement 400 and may thus be considered as safer to an obstacle than the first portion that is facing toward a direction that is the same as the direction of movement 400. Other examples are also possible.

Given the above implementations, the robotic system may determine in various ways the safety levels of one or more portions of the object. In an example implementation, the robotic system may obtain image data representative of the object. For instance, FIG. 5 illustrates the robotic arm 118 using the sensor 122 to obtain image data 500 representative of the object 300. Such image data 500 may be obtained before the robotic arm 118 grasps onto the object 300, once before the robotic arm 118 grasps onto the object 300, and/or during movement of the object 300, among other possibilities. Moreover, the robotic arm 118 may use one or more of the appendages 120A to 120C and the gripper 124 to reorient the object 300 (e.g., while the object 300 is still on the ground) so as to obtain image data 500 of various portions of the object 300 that are not immediately visible to the sensor 122. Additionally or alternatively, the robotic arm 118 could use image data 500 to identify the object 300 and could then use this identification to determine additional information regarding the various portions of the object 300 that are not immediately visible to the sensor 122.

In this example implementation, the robotic arm 118 may receive the image data 500 and may use the image data 500 (and/or the above-mentioned identification) as a basis for determining a surface profile of the object 300. The robotic arm 118 may determine the surface profile using various image processing techniques that are currently known or developed in the future or may do so in other ways. The determined surface profile may then represent properties of the various portions of the object. Such properties may include, but are not limited to: (i) a shape of each of the various portions of the object (e.g., angle(s) in each portion), (ii) a size of each of the various portions of the object, (iii) a thickness of each of the various portions of the object, (iv) an outline of each of the various portions of the object, (v) a curvature of each of the various portions of the object, and/or (vi) smoothness of each of the various portions of the object.

Once the robotic arm 118 determines the surface profile of the object 300, the robotic arm 118 may use the properties represented by the surface profile to determine a safety level for each of the various portions of the object 300. In one example, the robotic arm 118 may make a determination of whether a given portion of the object 300 includes at least one acute angle. If the determination is that the given portion of the object 300 includes at least one acute angle (e.g., portion 302A), then the robotic arm 118 may responsively make a selection of a first safety level (e.g., a safety level of two on the above mentioned scale of one to ten). Whereas, if the determination is that the given portion of the object 300 does not include an acute angle (e.g., portion 302C), then the robotic arm 118 may responsively making a selection of a second safety level (e.g., a safety level of eight on the above mentioned scale of one to ten) that is higher than the first safety level. In this manner, the robotic arm 118 can assign a specific safety level to a specific portion depending on whether or not the specific portion includes an acute angle. In some cases, the assignment of safety levels may also depend on the number of acute angles the specific portion has, with higher numbers of acute angle corresponding to lower safety levels.

In another example, rather than only considering presence of an acute angle (or the number of acute angles) as in the above example, the robotic arm 118 may assign different safety levels depending on the specific angles included in a given portion of the object 300. For instance, the robotic arm 118 may assign lower safety levels to lower corresponding angles while assigning higher safety levels to higher corresponding angles. As a specific example, the robotic arm 118 could make a determination that (i) a first portion of the plurality of portions comprises a first angle and (ii) a second portion of the plurality of portions comprises a second angle, with the second angle being larger than the first angle. Responsively, the robotic arm 118 may select (i) a first safety level for the first portion and (ii) a second safety level for the second portion, with the second safety level being higher than then first safety level.

This selection could take on various forms. In some cases, the robotic arm 118 could arbitrarily assign the first safety level to the first portion and then assign the second safety level (i.e., a higher safety level) to the second portion given that the second angle is larger than the first angle. In other cases, the robotic arm 118 could refer to mapping data that maps certain angles to certain safety levels and could then use this mapping data to assign the first and second safety levels based on the respective first and second angles. In either case, the robotic arm 118 can use such techniques to assign a relatively higher safety level for a relatively higher angle and vice versa. Note that such examples can extend to any of the properties of the surface profile (e.g., curvature, smoothness, size etc.). Other examples are also possible.

In some instances, the robotic arm 118 may additionally or alternatively consider other properties when determining the safety levels, such as properties other than those represented by the surface profile. These properties may include, but are not limited to: (i) material type of each of the portion of the object 300, (ii) hardness of each of the portions of the object 300, (iii) surface roughness of each of the portions of the object 300, (iv) surface area of each of the portions of the object 300, and (v) a configuration of each of the portions of the object 300.

If such other properties are not available to the robotic arm 118 and/or are not otherwise obtainable, then the robotic arm 118 may make a "worst case assumption" regarding the other properties of the object 300. By way of example, an example object may be a piece of Styrofoam having a shape of a screwdriver. If the robotic arm 118 cannot determine any properties of the piece other than the surface profile of the piece, then the robotic arm 118 may assume that the piece is actually a screwdriver (e.g., being made of a material that is harder than the Styrofoam) and may thus assign lower corresponding safety levels for the various portions of the piece when compared to the safety levels that the robotic arm 118 would assign had the robotic arm 118 been able to determine or otherwise obtain properties of the piece other than the surface profile of the piece.

In contrast, if the other properties are available to the robotic arm 118 and/or are otherwise obtainable by the robotic arm 118, then the robotic arm 118 may use such other properties as a further (or alternative) basis for determining the safety levels. As an initial matter, the robotic arm 118 could determine these other properties in various ways. By way of example, the robotic arm 118 may receive image data 500 and may identify the object (and/or type of object) based on the image data 500. Based on this identified object (and/or type of object), the robotic arm 118 may obtain information related to properties of each of the portions of the identified object (and/or type of object). The robotic arm 118 may do so, for instance, by referring to mapping data that maps certain objects (and/or types of objects) to certain properties, and the robotic arm 118 may then use the mapping data to obtain the appropriate properties.

Once the robotic arm 118 determines these other properties, the robotic arm 118 may use these other properties and/or properties represented by the surface profile to determine a safety level for each of the portions of the object 300. In an example implementation, the robotic arm 118 may determine different safety levels for different respective properties of a respective portion and may then determine a safety level for the respective portion using a weighted average of the different determined safety levels. By way of example, the robotic arm 118 may determine a first safety level based on shape of the portion 302A and may also determine a second safety level based on material type of the portion 302A. In this example, the robotic arm 118 may then determine the safety level of the portion based on a weighted average of the first and second safety levels. For instance, the first safety level may be given a first weight and the second safety level may be given a second weight that is lower than the first weight because the shape of the portion 302 may be considered to have a greater impact on safety of an obstacle when compared to the material type. Other examples are also possible.

Referring again to FIGS. 4A to 4D, the robotic arm 118 may use any of the above techniques to determine respective safety levels for the various portions 302A to 302D of the object. By way of example, the robotic arm 118 may determine a first safety level ("S1") corresponding to portion 302A, a second safety level ("S2") corresponding to portion 302B, a third safety level ("S3") corresponding to portion 302C, and a fourth safety level ("S4") corresponding to portion 302D. In a particular example, the robotic arm 118 may determine these safety levels based on the angles found in the portions 302A to 302D. In this example, S1 may be the lowest of the safety levels due to portion 302A having an acute angle while S3 may be the highest of the safety levels due to portion 302C being a flat portion. Also, S2 may be the second lowest of these safety levels due to the portion 302B having a right angle that is larger than the angle in portion 302A but is smaller than the respective angles in portions 302C and 302D. Further, S4 may be the second highest of these safety levels due to the portion 302D having an obtuse angle that is larger than the respective angles in portion 302A and 302B but is smaller than the flat angle in portion 302C. As such, the following is a listing of these safety levels by order of magnitude (from highest to lowest): (i) S3 corresponding to portion 302C, (ii) S4 corresponding to portion 302D, (iii) S2 corresponding to portion 302B, and (iv) S1 corresponding to portion 302A. Other examples are also possible.

Referring back to FIG. 2, at block 204, method 200 involves, based on the determined safety levels, the robotic system determining, for each of the plurality of relative orientations, a velocity limit for movement of the object with a particular relative orientation.

In an example implementation, the robotic system may use a determined safety level of a particular relative orientation to determine a velocity limit for when the robotic system moves the object with this particular relative orientation. The robotic system may do so for each of various relative orientation of the object. By way of example, the robotic system may determine higher velocity limits for higher corresponding safety levels while determining lower velocity limits for lower corresponding safety levels, so as to limit velocity of movement of the object in a particular relative orientation depending on safety of the particular relative orientation. In this example, the robotic system may thus refer to mapping data that maps certain safety levels to certain velocity limits and could select the velocity limit based on the mapping data, but the robotic system could also determine velocity limits in other ways.

In a more specific example, the robotic system could determine a first safety level for a first portion and a second safety level for a second portion, with the second safety level being higher than the first level. In this specific example, the robotic system could select a first velocity limit that corresponds to the first safety level and a second velocity limit that corresponds to the second safety level, with the second velocity limit being higher than the first velocity limit. Other examples are also possible.

Figure 6A:
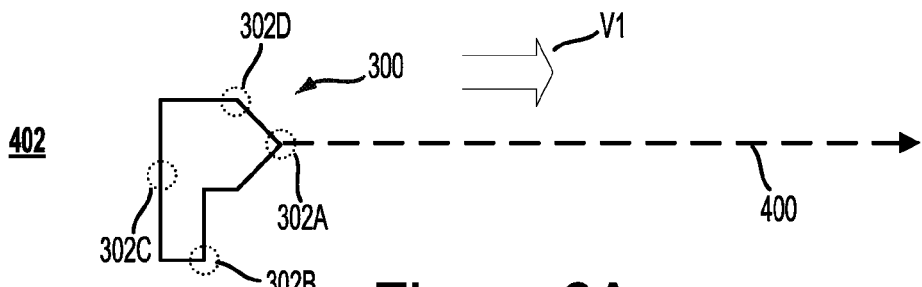
FIGS. 6A to 6D illustrate example velocity limits for the various example relative orientations of the object, according to an example implementation.
Figure 6B:
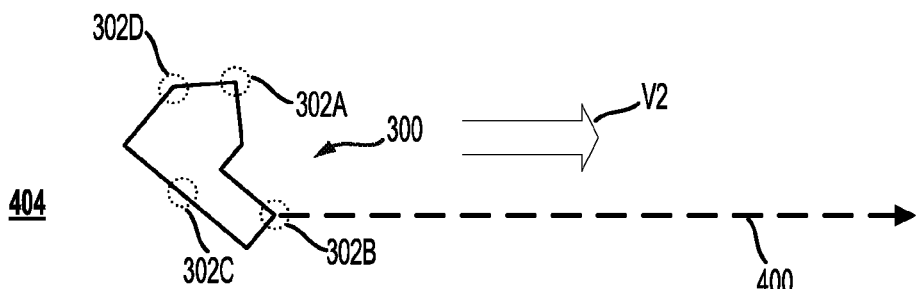
Figure 6C:
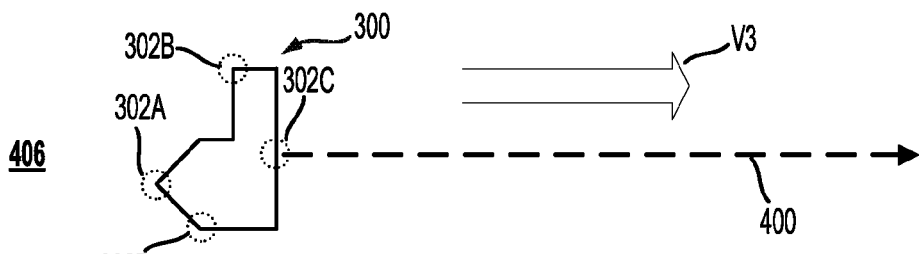
Figure 6D:
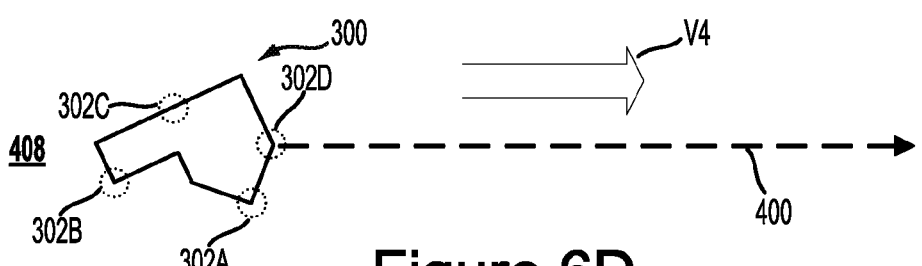

FIGS. 6A to 6D illustrate the relative orientations 402 to 408 along with selected respective velocity limits (e.g., each limit represented by magnitude of an arrow) for each of the relative orientations 402 to 408. As shown in FIG. 6A, portion 302A has a corresponding velocity limit of V1. This velocity limit of V1 is the lowest of the respective velocity limits due to portion 302A having the lowest corresponding safety level (e.g., S1 noted above). As shown in FIG. 6B, portion 302B has a corresponding velocity limit of V2. This velocity limit of V2 is the second lowest of the respective velocity limits due to portion 302B having the second lowest corresponding safety level (e.g., S2 noted above). As shown in FIG. 6C, portion 302C has a corresponding velocity limit of V3. This velocity limit of V3 is the highest of the respective velocity limits due to portion 302C having the highest corresponding safety level (e.g., S3 noted above). As shown in FIG. 6D, portion 302D has a corresponding velocity limit of V4. This velocity limit of V4 is the second highest of the respective velocity limits due to portion 302D having the second highest corresponding safety level (e.g., S4 noted above). As such, the following is a listing of these velocity limits by order of magnitude (from highest to lowest): (i) V3 corresponding to portion 302C, (ii) V4 corresponding to portion 302D, (iii) V2 corresponding to portion 302B, and (iv) V1 corresponding to portion 302A. Other examples are also possible.

In a further aspect, the robotic system could also consider other factors when determining the velocity limits. Such other factors may include, for instance, a representation of a maximum safe impact pressure. This maximum safe impact pressure defines the highest allowable impact pressure to be exerted by the object (e.g., in an event of a collision between the object and an obstacle). Moreover, this maximum safe impact pressure may be a policy decision provided via engineering input (e.g., by an owner of the robotic system). Thus, in some cases, the maximum safe impact pressure may be the same for all objects. While in other cases, the maximum safe impact pressure may be different for different objects or for different types of objects.

In this aspect, the robotic system may consider in various ways the maximum safe impact pressure when determining a respective velocity limit. By way of example, any of the above-mentioned properties (e.g., shape, hardness, surface area etc.) may have an effect on the impact pressure exerted by the object. In this example, the robotic system may thus determine a respective velocity limit that would ensure that an impact pressure is maintained below the maximum safe impact pressure given the various properties of a respective portion. This could be carried out, for instance, by obtaining an equation for determining impact pressure (e.g., provided via engineering input). Within this equation, the values for the various relevant properties may each be set as constant values while the value of velocity may be variable. Then, with this equation, the robotic system could determine different impact pressures resulting from different corresponding velocities, and the robotic system could then use the determined different impact pressures as basis for selecting a velocity limit to keep the impact pressure below the maximum safe impact pressure. Other aspects are also possible.

At block 206, method 200 involves, based at least in part on the determined velocity limits, the robotic system determining a path for moving the object from a first location to a second location.

As noted, the robotic system may consider various factors as part of the path planning process for moving the object from the first location to the second location. These factors may include obstacles in the environment, shape of the object, joint limits, and/or energy consumption limits, among others. According to the present disclosure, the robotic system may also consider the determined velocity limits (and/or the determined safety levels) as part of the path planning process. In particular, the path planning process may take the form of an optimization problem including the various factors as constraints in the optimization problem, with the velocity limits (and/or the determined safety levels) providing additional or alternative constraints in the optimization problem. Such an optimization problem could be solved using various optimization techniques currently known or developed in the future.

In one example, determining the path may involve using the determined velocity limits as a basis for determining a specific relative orientation of the object for each of one or more segments of the path. In particular, for each such segment, the robotic system may select the respective relative orientation from among one or more available relative orientations. These available relative orientations may be the relative orientations that the robotic system is actually capable of orientating the object at the respective segment given other factors, such as obstacles in the vicinity of respective segment for instance. When selecting this respective relative orientation from among the one or more available relative orientations, the robotic system may optimally select the relative orientation having the highest corresponding velocity limit, so as to allow the robotic system to move the object as fast as possible along this segment while considering other circumstances such as obstacles and/or safety of various relative orientations, among others.

In another example, determining the path may involve using the determined velocity limits as a basis for determining specific velocities to use for movement of the object along each of one or more segments of the path. In this example, determining the path may thus essentially involve determining a trajectory defining the path as well as the specific velocities to use along the path. In particular, while considering the other circumstances as noted above, the robotic system may determine for each segment a specific velocity that would be below the velocity limit corresponding to the orientation of the object at the respective segment. While doing so, the robotic system may select a combination of specific velocities with which the robotic system can move the object from the first location to the second location over the shortest possible time period. This may specifically involve selecting the highest possible velocity at each segment given the circumstances (e.g., given the selected relative orientation at each segment).

In other examples, determining the path may involve using the determined velocity limits as a basis for determining specific relative orientations and/or specific velocities at specific segments of the path. For instance, determining the path may involve using the determined velocity limits as a basis for determining a specific relative orientation and/or a specific velocity at the beginning of the path. In another instance, determining the path may involve using the determined velocity limits as a basis for determining a specific relative orientation and/or a specific velocity at the end of the path. In yet another instance, determining the path may involve using the determined velocity limits as a basis for determining a specific relative orientation and/or a specific velocity in the middle of the path. Other instances are also possible.

In a further aspect, the robotic system may optimally select a relative orientation having a portion with the lowest safety level facing toward a direction that is opposite the direction of movement. In this respect, the robotic system could optimally use this selected relative orientation whenever possible along the path while using other relative orientations along the path when certain circumstances (e.g., joint limits) do not allow the robotic system to use this selected relative orientation. In yet a further aspect, method 200 may be carried out in response to safety concerns, such as in response to determining presence of an obstacle (e.g., a human or other object) within a threshold distance from the object at issue and/or within a threshold distance from the robotic system, among others. Other aspects are also possible.

At block 208, method 200 involves the robotic system moving the object from the first location to the second location based on the determined path.

According to an example implementation, once the path planning process is complete as discussed above (or perhaps during the path planning process), the robotic system may move the object from the first location to the second location in accordance with the planned path and while using the various selected relative orientations and/or the various selected specific velocities. In this manner, the robotic system may move the object while considering safety of various relative orientations of the object along the path.

Figure 7:
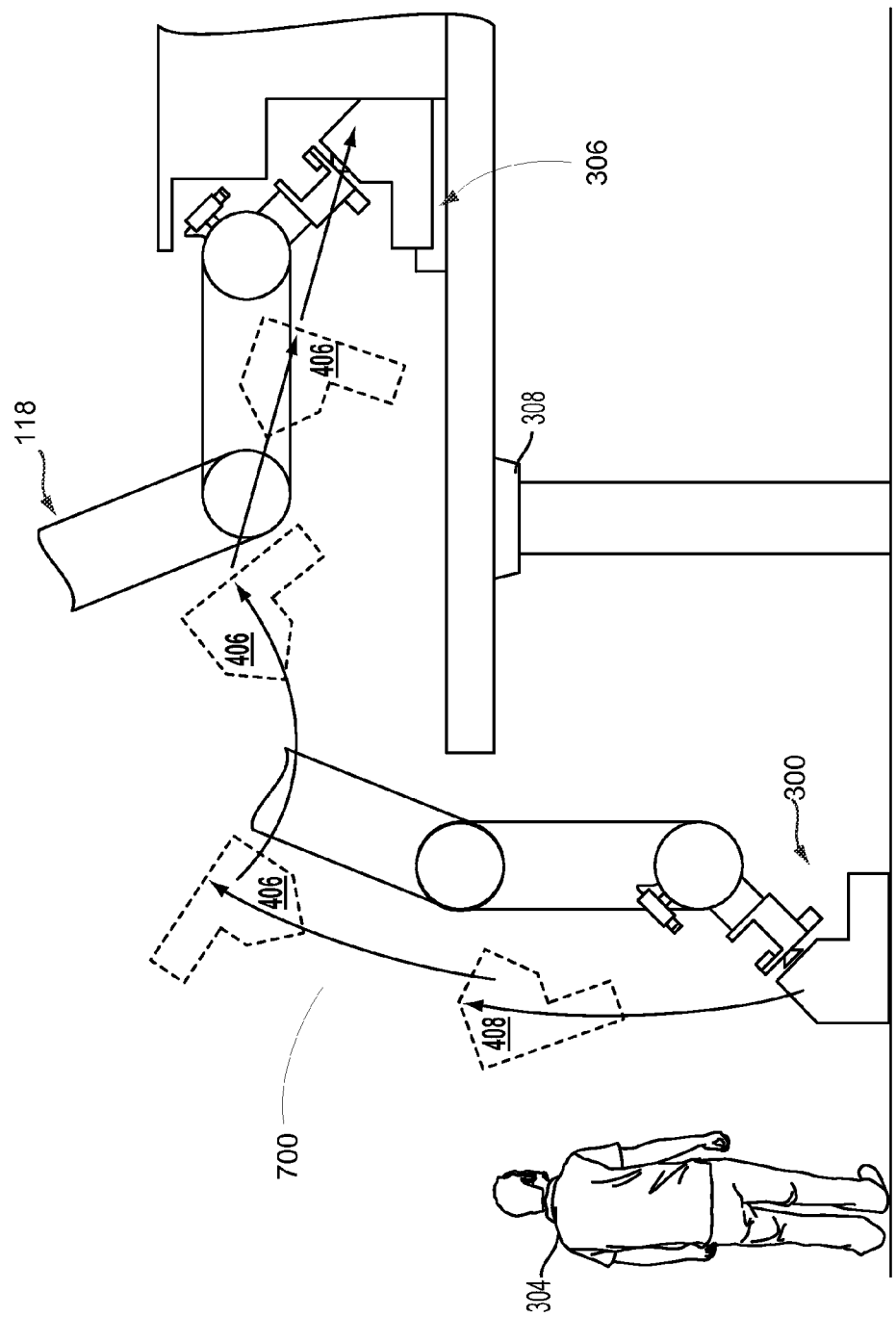
FIG. 7 illustrates the example robotic arm moving the object to the drop-off location, according to an example implementation.

For example, FIG. 7 shows an example planned path 700 for the robotic arm 118 to move the object 300 to the drop-off location 306. As shown in FIG. 7, in a first segment of the path 700, the robotic arm 118 is moving the object 300 with the relative orientation 408 and thus with a velocity that is below the velocity limit V4 corresponding to this relative orientation 408. In particular, the robotic arm 118 may have selected this relative orientation 408 for this first segment so as to ensure that portion 302A (e.g., the portion having the lowest safety level) is facing away from human 304 while having portion 302C (e.g., the portion having the highest safety level) facing towards the human 304, thereby considering other circumstances during the path planning process. Then, as further shown in FIG. 7, the robotic arm 118 is moving the object 300 with the relative orientation 406 for the remaining segments of the path 700 and thus with a velocity along those segments that is below the velocity limit V3 corresponding to this relative orientation 406. In particular, the robotic arm 118 may have selected this relative orientation 406 for the remaining segments due to the relative orientation 406 having the highest corresponding velocity limit V3, thereby ensuring that the object 300 is moved as fast as possible (i.e., over the shortest time period) given the circumstances. Other examples are also possible.

IV. Conclusion

The present disclosure is not to be limited in terms of the particular implementations described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims.

The above detailed description describes various features and functions of the disclosed systems, devices, and methods with reference to the accompanying figures. In the figures, similar symbols typically identify similar components, unless context dictates otherwise. The example implementations described herein and in the figures are not meant to be limiting. Other implementations can be utilized, and other changes can be made, without departing from the spirit or scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

The particular arrangements shown in the figures should not be viewed as limiting. It should be understood that other implementations can include more or less of each element shown in a given figure. Further, some of the illustrated elements can be combined or omitted. Yet further, an example implementation can include elements that are not illustrated in the figures.

While various aspects and implementations have been disclosed herein, other aspects and implementations will be apparent to those skilled in the art. The various aspects and implementations disclosed herein are for purposes of illustration and are not intended to be limiting, with the true scope being indicated by the following claims.

We claim:

1. A method comprising:
a robotic system determining a safety level for each of a plurality of relative orientations of an object, wherein each relative orientation of the plurality of relative orientations defines a spatial orientation of the object relative to a direction of movement of the object;
based on the determined safety levels, the robotic system determining, for each of the plurality of relative orientations, a velocity limit for movement of the object with a particular relative orientation;
based at least in part on the determined velocity limits, the robotic system determining a path for moving the object from a first location to a second location; and
the robotic system moving the object from the first location to the second location based on the determined path.

2. The method of claim 1, wherein determining a safety level for each of a plurality of relative orientations of an object comprises determining, for each of a plurality of portions of the object, a safety level when a respective portion of the plurality of portions is oriented toward the direction of movement of the object.

3. The method of claim 1, wherein the robotic system comprises an image capture device, and wherein determining a safety level for each of a plurality of relative orientations of an object comprises:
receiving image data from the image capture device;
based on the received image data, determining a surface profile of the object, wherein the surface profile comprises properties of each of a plurality of portions of the object; and
based on the surface profile, determining a safety level for each of the plurality of portions of the object, wherein each respective portion of the plurality of portions corresponds to at least one respective relative orientation from among the plurality of relative orientations.

4. The method of claim 3, wherein the properties comprise one or more of: (i) a shape of each of the plurality of portions, (ii) a size of each of the plurality of portions, (iii) a thickness of each of the plurality of portions, (iv) an outline of each of the plurality of portions, (v) a curvature of each of the plurality of portions, and (vi) a smoothness of each of the plurality of portions.

5. The method of claim 1, wherein the robotic system comprises an image capture device, and wherein determining a safety level for each of a plurality of relative orientations of an object comprises:
receiving image data from the image capture device;
identifying the object based on the received image data;
based on the identified object, obtaining information related to properties of each of a plurality of portions of the identified object; and
based at least in part on the properties of each of the plurality of portions of the identified object, determining a safety level for each of the plurality of portions of the object, wherein each respective portion of the plurality of portions corresponds to at least one respective relative orientation from among the plurality of relative orientations.

6. The method of claim 1,
wherein determining the velocity limit is further based on a representation of a maximum safe impact pressure defining a highest allowable pressure exerted by the object.

7. The method of claim 6,
wherein determining a safety level for each of a plurality of relative orientations of an object comprises at least (i) determining properties of each of a plurality of portions of the object and (ii) determining, for each of the plurality of portions, a safety level based on respective properties of a respective portion of the plurality of portions of the object, and
wherein determining the velocity limit based on the representation of the maximum safe impact pressure comprises determining the velocity limit to maintain an impact pressure below the maximum safe impact pressure given respective properties of the respective portion of the plurality of portions of the object.

8. The method of claim 7, wherein the properties comprise one or more of: (i) material type of each of the plurality of portions, (ii) hardness of each of the plurality of portions, (iii) surface roughness of each of the plurality of portions, (iv) surface area of each of the plurality of portions, and (v) a configuration of each of the plurality of portions.

9. The method of claim 1, wherein determining the path comprises:
based on the determined velocity limits, determining a specific relative orientation of the object for each of one or more segments of the path.

10. The method of claim 9, wherein determining a specific relative orientation of the object for each of one or more segments of the path comprises:
for each respective segment of the one or more segments of the path, selecting, from among one or more relative orientations that the robotic system is capable of orienting the object at the respective segment, a respective relative orientation having a highest corresponding velocity limit.

11. A non-transitory computer readable medium having stored therein instructions executable by one or more processors to cause a robotic system to perform functions comprising:
determining a safety level for each of a plurality of relative orientations of an object, wherein each relative orientation of the plurality of relative orientations defines a spatial orientation of the object relative to a direction of movement of the object;
based on the determined safety levels, determining, for each of the plurality of relative orientations, a velocity limit for movement of the object with a particular relative orientation;
based at least in part on the determined velocity limits, determining a path for moving the object from a first location to a second location; and
moving the object from the first location to the second location based on the determined path.

12. The non-transitory computer readable medium of claim 11, wherein determining a safety level for each of a plurality of relative orientations of an object comprises:

determining properties of each of a plurality of portions of the object, wherein each respective portion of the plurality of portions corresponds to at least one respective relative orientation from among the plurality of relative orientations;

based on the determined properties, making a determination of whether a respective portion of the plurality of portions comprises at least one acute angle;

if the determination is that the respective portion of the plurality of portions comprises at least one acute angle, then, responsive to the determination, making a selection of a first safety level; and if the determination is that the respective portion of the plurality of portions does not comprise at least one acute angle, then, responsive to the determination, making a selection of a second safety level that is higher than the first safety level.

13. The non-transitory computer readable medium of claim 12, wherein determining, for each of the plurality of relative orientations, a velocity limit for movement of the object with a particular relative orientation comprises:

if the selection is of the first safety level, then, responsive to the selection, determining a first velocity limit that corresponds to the first safety level;

if the selection is of the second safety level, then, responsive to the selection, determining a second velocity limit that corresponds to the second safety level, wherein the second velocity limit is higher than the first velocity limit.

14. The non-transitory computer readable medium of claim 11, wherein the robotic system comprises an image capture device, and wherein determining a safety level for each of a plurality of relative orientations of an object comprises:

receiving image data from the image capture device;

based on the received image data, determining a type associated with the object;

based on the determined type, obtaining information related to properties of each of a plurality of portions of the identified object; and based at least in part on the properties of each of the plurality of portions of the identified object, determining a safety level for each of the plurality of portions of the object, wherein each respective portion of the plurality of portions corresponds to at least one respective relative orientation from among the plurality of relative orientations.

15. The non-transitory computer readable medium of claim 11, the functions further comprising:

based on the determined velocity limits, determining specific velocities to use for movement of the object along each of one or more segments of the path.

16. The non-transitory computer readable medium of claim 15, wherein determining the specific velocities to use for movement of the object along each of one or more segments of the path comprises determining the specific velocities with which to move the object from the first location to the second location over a shortest time period.

17. A robotic system comprising:

one or more processors;

a non-transitory computer readable medium; and program instructions stored on the non-transitory computer readable medium and executable by the one or more processors to:

determine a safety level for each of a plurality of relative orientations of an object, wherein each relative orientation of the plurality of relative orientations defines a spatial orientation of the object relative to a direction of movement of the object;

based on the determined safety levels, determine, for each of the plurality of relative orientations, a velocity limit for movement of the object with a particular relative orientation;

based at least in part on the determined velocity limits, determine a path for moving the object from a first location to a second location; and move the object from the first location to the second location based on the determined path.

18. The robotic system of claim 17, wherein determining a safety level for each of a plurality of relative orientations of an object comprises determining, for each of a plurality of portions of the object, a safety level when a respective portion of the plurality of portions is oriented toward the direction of movement of the object.

19. The robotic system of claim 17, wherein determining a safety level for each of a plurality of relative orientations of an object comprises:

determining properties of each of a plurality of portions of the object, wherein each respective portion of the plurality of portions corresponds to at least one respective relative orientation from among the plurality of relative orientations; and based on the determined properties, making a determination that (i) a first portion of the plurality of portions comprises a first angle and (ii) a second portion of the plurality of portions comprises a second angle, wherein the second angle is larger than the first angle;

in response to the determination, making a selection of (i) a first safety level for the first portion and (ii) a second safety level for the second portion, wherein the second safety level is higher than then first safety level.

20. The robotic system of claim 19, wherein determining, for each of the plurality of relative orientations, a velocity limit for movement of the object with a particular relative orientation comprises:

in response to making the selection, determining (i) a first velocity limit that corresponds to the first safety level and (ii) a second velocity limit that corresponds to the second safety level, wherein the second velocity limit is higher than the first velocity limit.

\* \* \* \* \*